(12) United States Patent
Kashihara et al.

(10) Patent No.: US 6,763,164 B2
(45) Date of Patent: Jul. 13, 2004

(54) METHOD FOR MANUFACTURING A PLANAR LIGHTWAVE CIRCUIT, AND PLANAR WAVEGUIDE CIRCUIT

(75) Inventors: Kazuhisa Kashihara, Tokyo (JP); Kazutaka Nara, Tokyo (JP); Yoshinobu Nekado, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 212 days.

(21) Appl. No.: 09/803,964

(22) Filed: Mar. 13, 2001

(65) Prior Publication Data

US 2001/0055444 A1 Dec. 27, 2001

(30) Foreign Application Priority Data

Mar. 13, 2000 (JP) ........................................ 2000-068292

(51) Int. Cl.[7] .............................. G02B 6/42; G02B 6/34
(52) U.S. Cl. ............................................ 385/37; 385/31
(58) Field of Search ............................. 385/37, 14, 19, 385/25, 31

(56) References Cited

U.S. PATENT DOCUMENTS

| 4,883,743 A | * | 11/1989 | Booth et al. ................. 430/321 |
|---|---|---|---|
| 5,117,470 A | | 5/1992 | Inoue et al. .................. 385/14 |
| 6,187,632 B1 | * | 2/2001 | Shuto et al. ................. 438/257 |
| 6,292,609 B1 | * | 9/2001 | Matsushima et al. ......... 385/43 |
| 6,503,788 B1 | * | 1/2003 | Yamamoto .................. 438/231 |
| 2002/0000613 A1 | * | 1/2002 | Ohtani et al. ............... 257/347 |
| 2003/0062499 A1 | * | 4/2003 | Yamazaki ................... 251/200 |

* cited by examiner

*Primary Examiner*—Chandrika Prasad
(74) *Attorney, Agent, or Firm*—Oblon, Spivak, McClelland, Maier & Neustadt, P.C.

(57) ABSTRACT

The invention provides a simple metallic film manufacturing method for manufacturing an arrayed waveguide grating able to set each light transmitting central wavelength to a set wavelength at optionally predetermined temperature (for example 25° C.). The arrayed waveguide grating is manufactured by using this method. The light transmitting central wavelength of a circuit forming a waveguide forming area on a substrate is measured, and a shift of the light transmitting central wavelength from the set wavelength is corrected by annealing process. A mask has a hole approximately formed in the same shape as the manufactured metallic film, and is arranged such that the hole of the mask corresponds to a manufacturing portion of the metallic film. The metallic film is manufactured by evaporation, etc. A intersecting planes is formed by primary cutting, and a position shifting member is fixed through the metallic film and solder, and a non-intersecting planes is formed by secondary cutting so that the waveguide forming area is cut and separated.

4 Claims, 6 Drawing Sheets

ANNEAL PROCESSING

SECONDARY CUTTING (SLAB CUTTING)

MEASUREMENT OF LIGHT TRANSMITTING CENTERL WAVELENGTH

Fig. 1C

ANNEAL PROCESSING

Fig. 1D

MANUFACTURE OF METALLIC FILM

Fig. 1E

PRIMARY CUTTING

Fig. 1F

ROD FIXATION

Fig. 1G

SECONDARY CUTTING (SLAB CUTTING)

Fig. 2

Fig. 3A 
ANNEAL PROCESSING

Fig. 3B 
MANUFACTURE OF METALLIC FILM

Fig. 3C 
MANUFACTURE OF SOLDER FILM

Fig. 3D 
PRIMARY CUTTING

Fig. 3E 
ROD FIXATION

Fig. 3F 
SECONDARY CUTTING (SLAB CUTTING)

MANUFACTURE OF METALLIC FILM

Fig. 5C

PRIMARY CUTTING

Fig. 5D

ROD FIXATION

Fig. 5E

SECONDARY CUTTING (SLAB CUTTING)

METHOD FOR MANUFACTURING A PLANAR LIGHTWAVE CIRCUIT, AND PLANAR WAVEGUIDE CIRCUIT

BACKGROUND OF THE INVENTION

In recent years, in the field of optical communications, the WDM(Wavelength Division Multiplexing) optical communications is vigorously researched and developed in order to increase transmission capacity, and is being practically used. In the optical wavelength division multiplexing communications, for example, plural lights having a wavelength different from one another are multiplexed in wavelength and are transmitted. The WDM optical communications system includes an optical transmitting device that transmits only the beams of light having predetermined wavelengths in order to extract the light beam of each wavelength from the multiplexed beams at a light receiving side.

Figure 4:
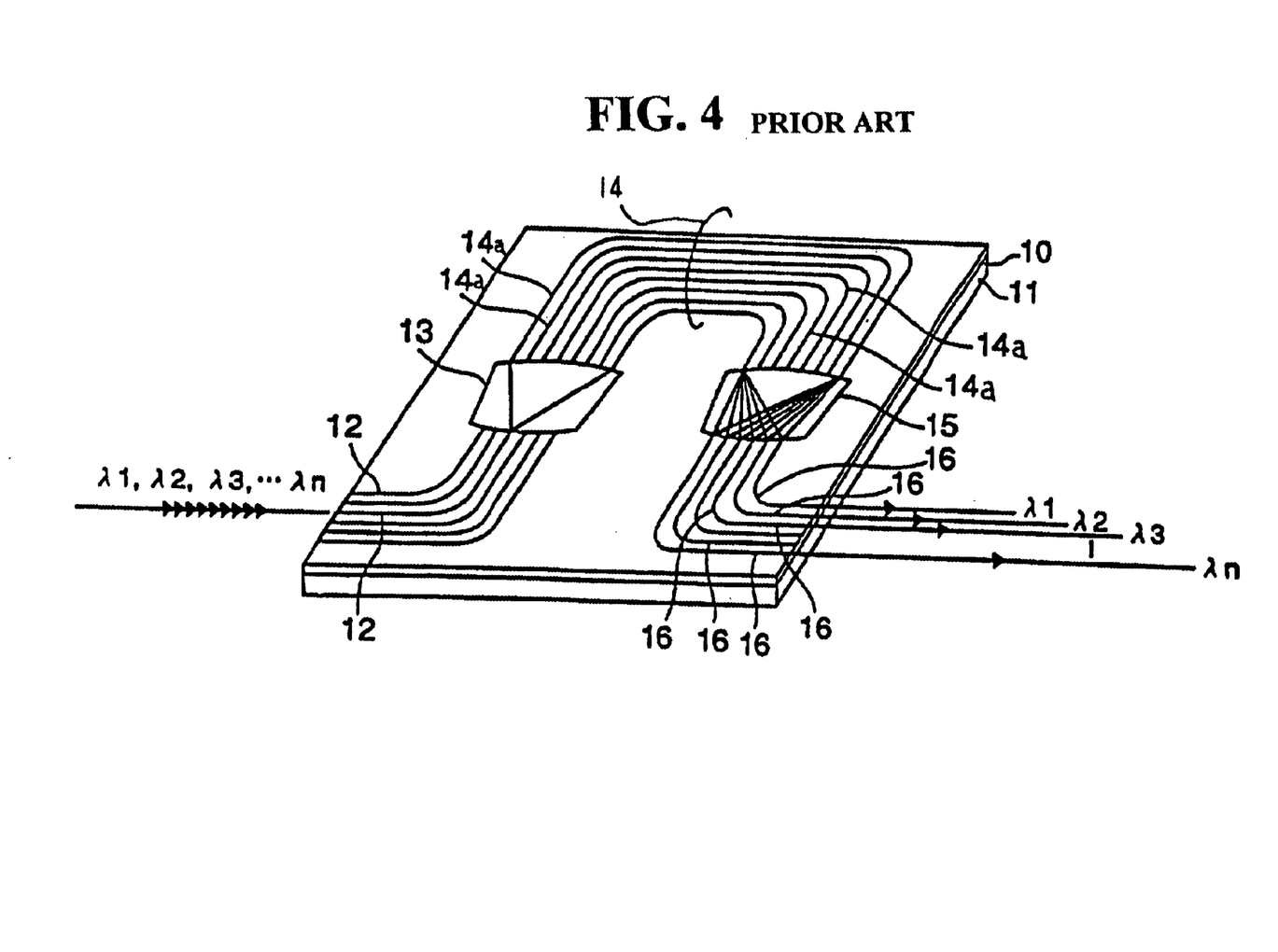
FIG. 4 is a schematic perspective view showing a constructional example of the conventional arrayed waveguide grating together with its operation.

FIG. 4 shows an arrayed waveguide grating (AWG) of a planar lightwave circuit by way of one example of the optical light transmitting device. In the arrayed waveguide grating, a waveguide is formed from quartz based glass on a substrate 11 of silicon etc. as shown in FIG. 4. This waveguide is composed of: one or more optical input waveguides 12 arranged side by side; a first slab waveguide 13 connected to the exit end of the optical input waveguide 12; An arrayed waveguide 14 connected to the exit end of the first slab waveguide 13; A second slab waveguide 15 connected to the exit end of the arrayed waveguide 14; and a plurality of optical output waveguides 16 arranged side by side and connected to the exit end of the second slab waveguide 15.

The arrayed waveguide 14 propagates light that is outputted from the first slab waveguide 13, and is composed of a plurality of channel waveguides 14a that are arranged side by side. Lengths of adjacent channel waveguides 14a are different from each other with the preset difference (ΔL). For example, the optical output waveguides 16 are arranged in accordance with the number of signal lights having wavelengths different from each other and divided by the arrayed waveguide grating. Many channel waveguides 14a such as 100 channel waveguides are normally arranged. However, in FIG. 4, the numbers of optical output waveguides 16, channel waveguides 14a and optical input waveguides 12 are schematically shown for brevity of this figure.

For example, an optical fiber on a signal transmitting side is connected to the optical input waveguide 12, and wavelength multiple light is introduced into the optical input waveguide 12. Light having traveled through the optical input waveguide 12 introduced to the first slab waveguide 13 is diffracted by the diffraction effect and enters to the arrayed waveguide 14 to travel along the arrayed waveguide 14.

Having traveled through the arrayed waveguide 14, the light reaches the second slab waveguide 15, and is further converged into the optical output waveguide 16, and is outputted. However, since the setting amounts of lengths of the respective channel waveguides 14a of the arrayed waveguide 14 are different from each other, a phase shifts between the individual beams of light are occured after this light is propagated in the arrayed waveguide 14. A wave front of the beams of light is inclined in accordance with this phase shift, and a converging position is determined by an angle of this inclination. Therefore, the converging positions of lights having different wavelengths are different from each other. Thus, the lights having different wavelengths can be outputted from the different optical output waveguides 16 every wavelength by forming the optical output waveguides 16 in the respective converging positions.

For example, as shown in FIG. 4, when wavelength multiple lights of wavelengths $\lambda 1, \lambda 2, \lambda 3, \ldots, \lambda n$ (n is an integer equal to or greater than 2) are inputted from one optical input waveguide 12, these lights are deffracted by the first slab waveguide 13, and reaches the arrayed waveguide 14. Then, these lights are converged in different positions in accordance with wavelengths through the second slab waveguide 15 as mentioned above, and are entered to the optical output waveguides 16 different from each other. These lights are outputted from the exit ends of the optical output waveguides 16 through the respective optical output waveguides 16. An optical fiber for optical output is connected to the exit end of each optical output waveguide 16, and the light of each wavelength is taken out through this optical fiber.

In this arrayed waveguide grating, waveguide resolution of the arrayed waveguide grating is proportional to the difference (ΔL) in length between the adjacent channel waveguides 14a of the arrayed waveguide Therefore, wavelength multiple light having a narrow wavelength interval unable to be realized in the conventional multiplexer/demultiplexer can be multiplexed and demultiplexed by greatly setting the difference ΔL in design. Thus, it is possible to fulfill a multiplexing/demultiplexing function of optical signals required to realize optical wavelength division multiplexing communications of high density, i.e., a function for demultiplexing/multiplexing a plurality of optical signals having a wavelength interval equal to or smaller than 1 nm.

The arrayed waveguide grating utilizes the reciprocity (reversibility) principle of an optical circuit. Therefore, the arrayed waveguide grating functions as an optical demultiplexer and also functions as an optical multiplexer. That is, in a direction reverse to the direction in FIG. 4, the light beams having a plurality of different wavelengths enter the optical output waveguides 16 corresponding to the respective wavelengths, then travel through the transmission path in the reverse direction. These light beams are multiplexed in the arrayed waveguide 14 and exit through one optical input waveguide 12.

SUMMARY OF THE INVENTION

The invention provides a manufacturing method of a metallic film to a planar lightwave circuit. This method comprises the following steps of:

preparing a mask having a hole approximately formed in the same shape as the metallic film manufactured on at least one of front and rear faces of the planar lightwave circuit;

arranging the mask such that the hole of the mask corresponds to a manufacturing portion of the metallic film; and manufacturing the metallic film in the manufacturing portion of the metallic film through the hole of the mask.

The invention also provides a planar lightwave circuit having a metallic film in another aspect.

This planar lightwave circuit has the waveguide construction of an arrayed waveguide grating, and this waveguide construction comprises:

one or more optical input waveguides arranged side by side;

a first slab waveguide connected to the exit end of said optical input waveguides;

an arrayed waveguide connected to the exit end of said first slab waveguide, and consisting of a plurality of channel waveguides arranged side by side for transmitting light that has traveled through said first slab waveguide, said channel waveguides having different lengths with the difference preset;

a second slab waveguide connected to the exit end of the arrayed waveguide; and a plurality of optical output waveguides arranged side by side and connected to the exit end of said second slab waveguide;

wherein a slab waveguide is divided into two by intersecting planes that intersect the route of the light traveling along the slab waveguide. The intersecting planes serve as dividing planes and divide a waveguide forming region into a first waveguide forming region that includes one portion of the divided slab waveguide and a second waveguide forming resion that includes the other portion of the divided slab waveguide. One or both of the first waveguide forming region and the second waveguide forming region are moved along the dividing planes by a position shifting member;

an end portion side of the position shifting member is fixed to at least the one of the first waveguide forming region and the second waveguide forming region through the metallic film; and the metallic film is manufactured by the manufacturing method of the metallic film mentioned above.

BRIEF DESCRIPTION OF THE DRAWINGS

Exemplary embodiment of invention will be understood in conjunction with the drawings, in which.

DETAILED DESCRIPTION

In an arrayed waveguide grating, a light transmitting central wavelength is shifted from a set wavelength such as a grid wavelength, etc. by an error in manufacture of this arrayed waveguide grating. Accordingly, Japanese Patent Application No. 341146/1998 proposes that the set wavelength is set by correcting this shift in light transmitting central wavelength by annealing process. In accordance with this proposal, the arrayed waveguide grating is arranged under a set temperature atmosphere in which a high temperature such as 700° C. to 800° C. is set in advance. The shift in light transmitting central wavelength can be corrected after a preset time has passed.

Figure 2:
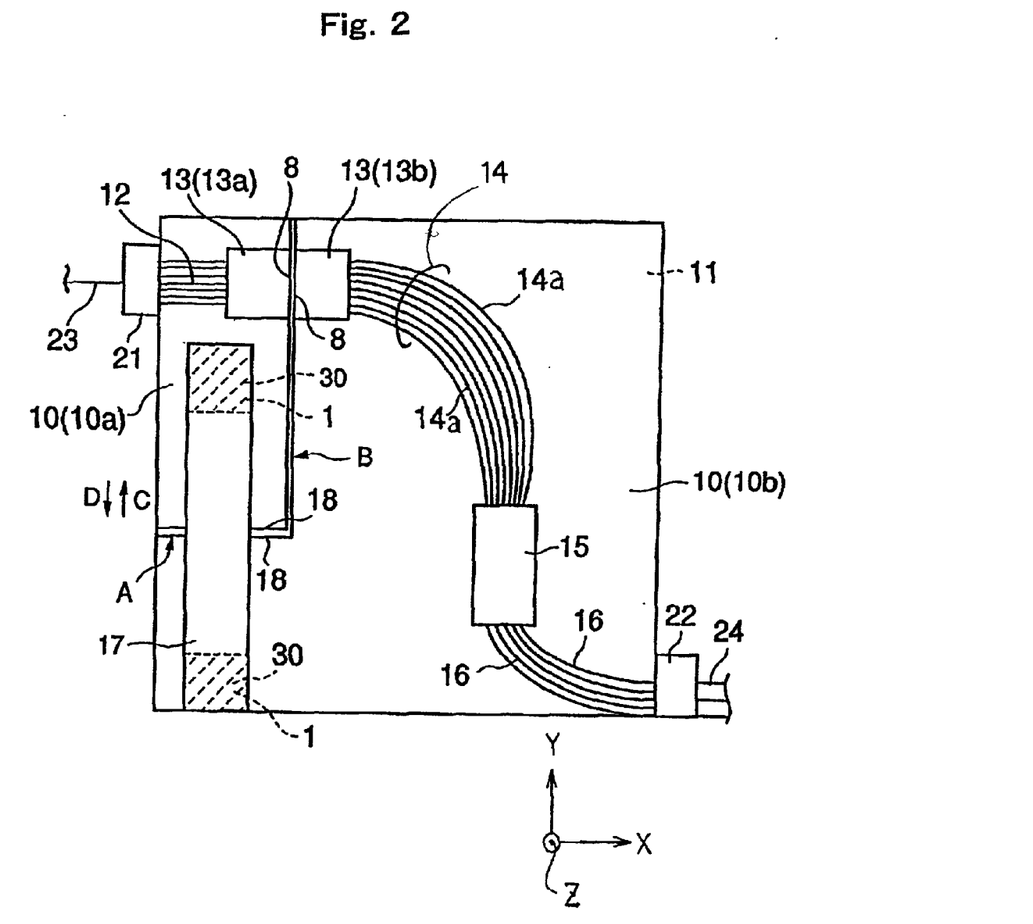
FIG. 2 is a plan view showing a dividing area of the arrayed waveguide grating able to reduce temperature dependence of a light transmitting center wavelength in more detail.

In contrast to this, the arrayed waveguide grating is originally mainly constructed by quartz based glass Therefore, an effective refractive index $n_c$ of an arrayed waveguide 14 is changed by temperature dependence of this quartz based glass, and the light transmitting central wavelength of the arrayed waveguide grating is shifted in dependence on temperature. An arrayed waveguide grating able to compensate this temperature dependence shift property is proposed in Japanese Patent Application No. 370457/1999 in which inventors KASHIHARA, NARA and NEKADO are the same inventors as this application. FIG. 2 shows a basic construction of the arrayed waveguide grating of this proposal.

In the arrayed waveguide grating shown in FIG. 2, a waveguide forming area 10 constructed by e.g., quartz based glass is formed on a substrate 11. The waveguide forming area 10 has a waveguide construction approximately similar to that in a conventional example. However, in the arrayed waveguide grating shown in FIG. 2, a first slab waveguide 13 is cut and separated on the intersecting planes 8 crossing an optical path passing the first slab waveguide 13.

The intersecting planes 8 are formed downward from one end side (an upper end side in FIG. 2) of the waveguide forming area 10 to a central portion of the waveguide forming area. A non-intersecting planes 18 perpendicular to the intersecting planes 8 (the non-intersecting planes 18 may not be necessarily set to be perpendicular to the intersecting planes 8) is formed.

In the arrayed waveguide grating of this proposal, the intersecting planes 8 and the non-intersecting planes 18 divide the waveguide forming area 10 into a first waveguide forming area 10a including a divided slab waveguide 13a on one side and a second waveguide forming area 10b including a divided slab waveguide 13b on the other side.

A position shifting member 17 with a thermal expansion coefficient larger than that of the waveguide forming area 10 and the substrate 11 is formed in a mode in which the position shifting member 17 lies across the first waveguide forming area 10a and the second waveguide forming area 10b through the non-intersecting planes 18. The position shifting member 17 is constructed such that the first waveguide forming area 10a is moved along the intersecting planes 8 with respect to the second waveguide forming area 10b. For example, the position shifting member 17 is formed by a copper plate having $1.65 \times 10^{-5}$ (1/K) in thermal expansion coefficient.

Beneath the position shifting member 17, solder 30 is formed in each fixing sites 30 indicated by the oblique broken line in FIG. 2. A metallic film 1 is formed on a lower side of this solder 30. The position shifting member 17 is fixed at each fixing sites 30 to the waveguide forming areas 10a and 10b through the metallic film 1 and the solder 30.

Figure 5A:
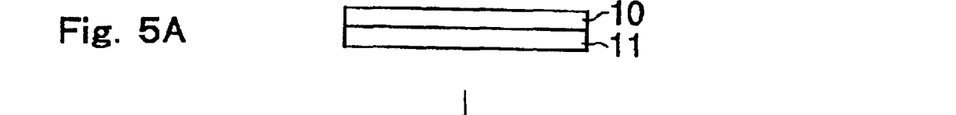
FIGS. 5A to 5E are explanatory views showing a manufacturing process example of the arrayed waveguide grating proposed by the present inventors in a separate Japanese Patent Application No. 370457/1999.
Figure 5B:
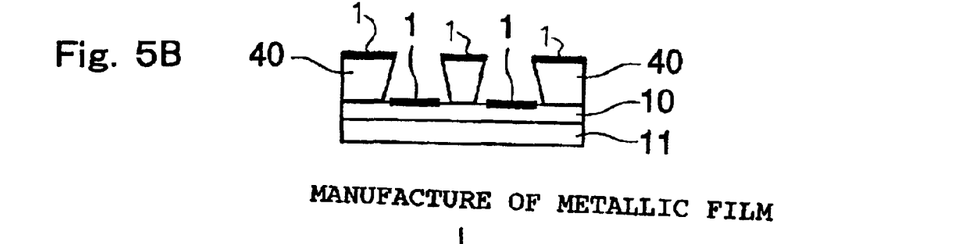

When the arrayed waveguide grating of this proposal is manufactured, as shown in FIG. 5A, a waveguide forming area 10 having a waveguide construction similar to that of the conventional arrayed waveguide grating is first formed on a substrate 11. Next, a resist mask 40 is formed on a surface side of the waveguide forming area 10 as shown in FIG. 5B. This resist mask 40 is formed by photolithography. Namely, the surface of the waveguide forming area 10 is coated with a resist, and this resist is exposed through a photomask with a predetermined set pattern, and is then developed.

Figure 5C:
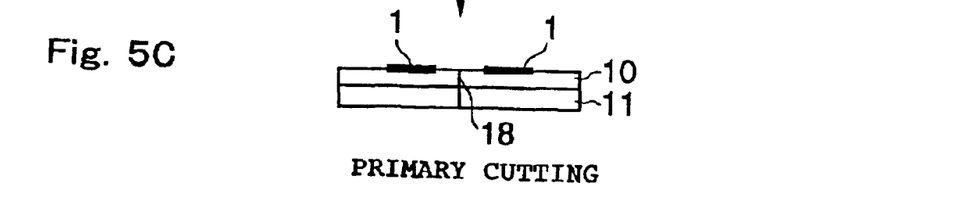
Figure 6A:
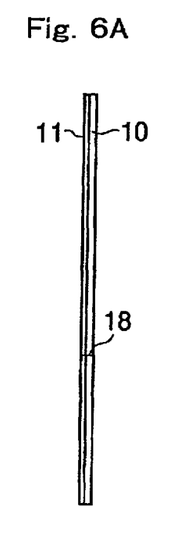
FIGS. 6A and 6B are explanatory views of primary cutting of the arrayed waveguide grating.
Figure 6B:
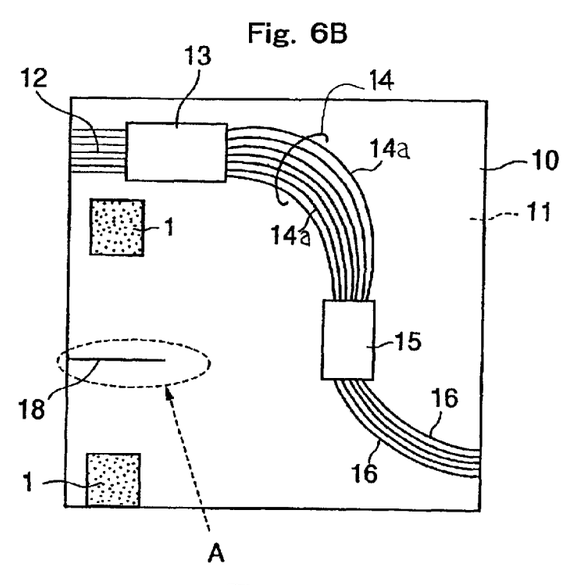

As shown in FIG. 5B, a metallic films 1 are formed on the surface side of the waveguide forming area 10 through this resist mask 40 by EB (electron beam) evaporation, sputtering, etc. The metallic films 1 become a ground of the solder 30, and is formed in a shape as shown in FIG. 6B, and metallic films 1 are spaced from each other. Thereafter, the resist mask 40 and the solder 30 on the resist mask 40 are lifted off by a solvent. Thus, a chip is formed (separated into one arrayed waveguide grating) as shown in FIGS. 5C, 6A and 6B. The arrayed waveguide grating is primarily cut to form a non-intersecting planes 18 within an area shown by a portion A between the metallic films 1.

Figure 5D:
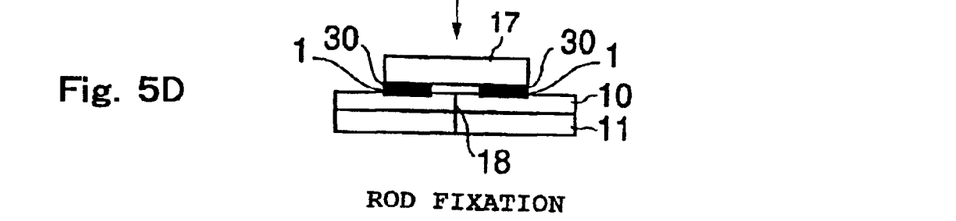

Next, Sn/Pb (60%/40%) solder 30 (unillustrated in FIGS. 6A and 6B) is formed on the metallic film 1. Thereafter, as shown in FIG. 5D, the solder 30 is melted in an arranging state of the position shifting member 17. Thus, the position shifting member 17 is fixed to the waveguide forming area 10 by the solder (rod fixing process). The solder 30 is melted by a chip of the solder 30 using a hot plate as one example. The metallic film 1 is arranged to improve a close contact property of the surface (a glass face in this example) of the waveguide forming area 10 and the solder 30. The solder 30 is arranged to make the metallic film 1 and the position shifting member 17 come in close contact with each other.

Figure 5E:
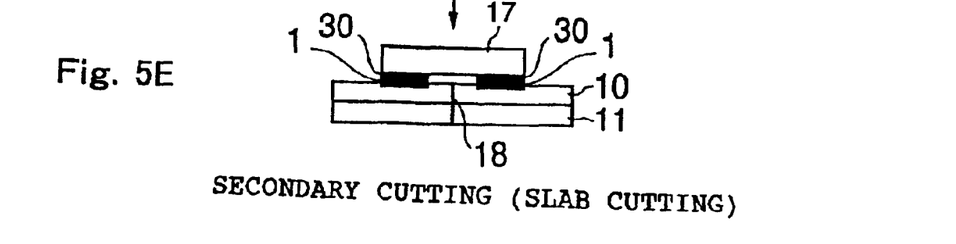
Figure 6C:
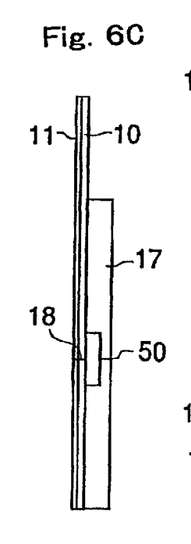
FIGS. 6C and 6D are explanatory views of secondary cutting of the arrayed waveguide grating.
Figure 6D:
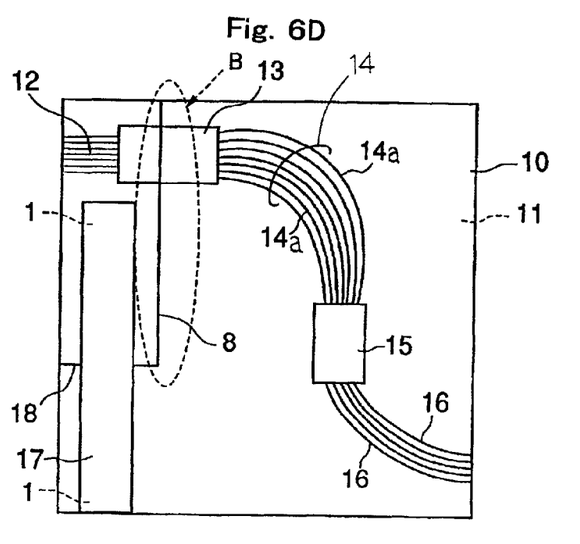

Thereafter, as shown in FIG. 5E, the arrayed waveguide grating is secondarily cut by a dicing saw, etc. so that a intersecting planes 8 is formed. As shown in FIG. 6D, the intersecting planes 8 is formed so as to cross an optical path passing the first slab waveguide 13 so that the arrayed waveguide grating is formed as shown in FIG. 2. Reference numeral 50 of FIG. 6C designates a groove portion formed in the position shifting member 17.

In the arrayed waveguide grating of this proposal, as shown in FIG. 2, the first waveguide forming area 10a is moved by the position shifting member 17 along the intersecting planes 8 in the directions of arrows C and D, and opposed faces of divided slab waveguides 13a, 13b are relatively displaced. Thus, it is possible to compensate temperature dependence of each light transmitting central wavelength of the arrayed waveguide grating.

The above excellent effects can be obtained in the arrayed waveguide grating of this proposal. Accordingly, the present inventors have considered that, if the construction of this arrayed waveguide grating and a method for correcting a shift in light transmitting central wavelength by the annealing process are combined with each other, it is possible to manufacture an excellent arrayed waveguide grating able to compensate the shift in light transmitting central wavelength due to the temperature dependence and approximately set each light transmitting central wavelength of the arrayed waveguide grating to a set wavelength at optionally predetermined temperature (for example 25° C.) with good yield.

However, when the annealing process is performed with respect to the arrayed waveguide grating of the proposal shown in FIG. 2, the metallic film 1 is melted, oxidized and deteriorated by the annealing process at high temperature. Therefore, it is necessary to perform the annealing process before manufacture of the metallic film 1 in manufacture of the arrayed waveguide grating so as to realize the above combination. However, a dedicated manufacturing device of the arrayed waveguide grating executes a series of respective processes from formation of the circuit construction shown in FIG. 5A to the secondary cutting of the arrayed waveguide grating shown in FIG. 5E via a process of the manufacture of the metallic film 1 shown in FIG. 5B, etc. Therefore, it is difficult to insert a process of the annealing process into an intermediate portion of this series of processes.

In a metallic film manufacturing process to the arrayed waveguide grating shown in FIG. 5B, formation of the resist mask using photolithography, evaporation or sputtering of the metallic film, and left-off of the resist mask are performed as mentioned above. A device for automatically performing these operations is constructed in accordance with a wafer formed in a disk shape similar to that used in a semiconductor industry. Therefore, if the circuit construction of the arrayed waveguide grating shown in FIG. 5A is manufactured and is then formed as a chip, and measurement of the light transmitting central wavelength and the annealing process are sequentially performed, and the metallic film is then manufactured in FIG. 5B, and processes until FIG. 5E are performed, cost of this new equipment for performing these processes becomes very high.

Accordingly, the present inventors have considered that a metallic film manufacturing method able to manufacture the metallic film by a simple operation at low device cost should be first invented to combine the construction of the arrayed waveguide grating of the proposal shown in FIG. 2 and the method for correcting a shift in light transmitting central wavelength by the annealing process. It is possible to propose a process for manufacturing the arrayed waveguide grating able to set each light transmitting central wavelength of the arrayed waveguide grating to a set wavelength at optionally predetermined temperature (for example 25° C.) with good yield by combining this invented method and the annealing process.

An object of one embodiment of the present invention is to provide a method able to manufacture a planar lightwave circuit of the arrayed waveguide grating, etc. able to set the light transmitting central wavelength to a set wavelength at optionally predetermined temperature (for example 25° C.) with good yield. An object of another embodiment of the invention is to provide a planar lightwave circuit having a metallic film manufactured by using a manufacturing method of the metallic film to this planar lightwave circuit.

In one embodiment of the manufacturing method of the metallic film to the planar lightwave circuit of the invention, it is not necessary to perform a complicated operation such as photolithography and lift-off as shown in FIG. 5B. In this embodiment, a mask having a hole (formed in advance) approximately having the same shape as the manufactured metallic film is prepared and arranged such that the mask hole corresponds to a manufacturing portion of the metallic film, and the metallic film is manufactured in its manufacturing portion. Accordingly, since a operation is simple, a equipment construction for performing this operation is also simplified, and its equipment construction is obtained to slightly improve a conventional equipment, therefore device cost can be reduced.

This metallic film is manufactured after the annealing process. If the position shifting member able to compensate temperature dependence of the light transmitting central wavelength of the arrayed waveguide grating is fixed to at least one of front and rear faces of the arrayed waveguide grating through the metallic film after the metallic film is manufactured, it is possible to propose a process for manufacturing the arrayed waveguide grating able to approximately set each light transmitting central wavelength of the arrayed waveguide grating to a set wavelength at optionally predetermined temperature (for example 25° C.) with good yield.

It is also possible to form other suitable device by combining the annealing process and the manufacture of the metallic film in the planar lightwave circuit.

An embodiment of the invention will next be explained in detail, but the same reference symbols are used to denote identical or corresponding parts through out the several views, and redundant explanations thereof will not be repeated. FIGS. 1A to 1G show manufacturing processes of the arrayed waveguide grating to which one embodiment of the manufacturing method of the metallic film to the planar lightwave circuit in the invention is applied. An external appearance construction of the arrayed waveguide grating manufactured in the manufacturing processes of FIG. 1 is similar to that shown in FIG. 2.

In the arrayed waveguide grating in accordance with one embodiment of the invention, annealing process for correcting a central wavelength of light transmitting wavelengths to a set wavelength is performed in the substrate 11 and the waveguide forming area 10 shown in FIG. 2. A shift of the light transmitting central wavelength from the set wavelength (e.g., a grid wavelength) due to an error in manufacture of the arrayed waveguide grating is almost set to zero.

Figure 1A:
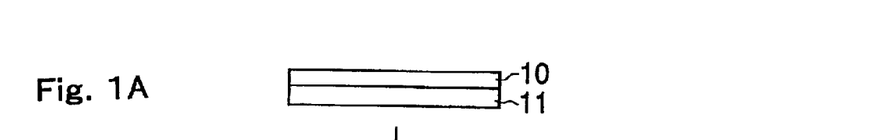
FIGS. 1A to 1G are explanatory views showing a manufacturing process example of an arrayed waveguide grating to which one embodiment of a manufacturing method of a metallic film to a planar lightwave circuit in the present invention is applied.
Figure 1B:
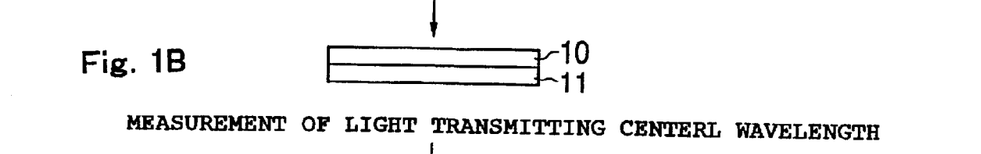

Manufacturing processes of the arrayed waveguide grating applying the manufacturing method of the metallic film in this embodiment thereto will next be explained on the basis of FIGS. 1A to 1G, FIG. 2 and FIGS. 6A to 6D. First, as shown in FIG. 1A, a waveguide forming area 10 having a waveguide construction (see FIG. 4) similar to that in the conventional arrayed waveguide grating is formed as a chip on a substrate 11. Next, in a process shown in FIG. 1B, a light transmitting central wavelength of the arrayed waveguide grating is measured by a wellknown measuring method.

Figure 1C:
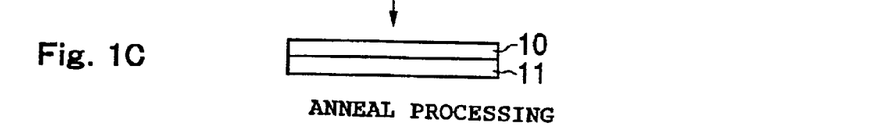

Next, as shown in FIG. 1C, the annealing process of the chip of the arrayed waveguide grating is performed to correct a shift of the light transmitting central wavelength from the set wavelength on the basis of results of this measurement.

Figure 1D:
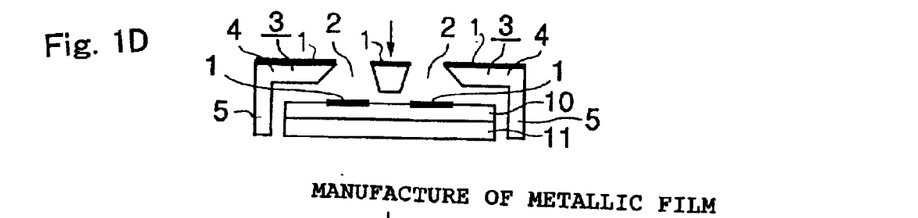

Thereafter, the chip of the arrayed waveguide grating is returned to e.g., a normal temperature. As shown in FIG. 1D, a mask (mask jig) 3 having a hole 2 (formed in advance) approximately having the same shape as the manufactured metallic film is arranged such that the hole 2 of the mask 3 corresponds to a manufacturing portion of the metallic film. The metallic film 1 is manufactured in its manufacturing portion by evaporation, etc. After the metallic film 1 is manufactured, the mask 3 is detached.

As shown in FIG. 1D, when the mask 3 is formed in a shape (box type shape) having an upper plate portion 4 covering a surface side of the waveguide forming area 10 of the arrayed waveguide grating and a side plate portion 5 covering a side face of the arrayed waveguide grating as one example, the manufacturing portion of the metallic film can be easily positioned by inserting the chip into the mask (mask jig) 3. Further, the mask 3 can be attached to a equipment conventionally used by forming the mask 3 in the same shape as a wafer for a substrate as one example. Therefore, it is not necessary to manufacture a new attachment, etc. for attaching the mask 3, and the metallic film 1 is easily manufactured. In detachment of the chip of the arrayed waveguide grating, it is sufficient to simply detach the mask 3 from the equipment, and simply detach the chip from the interior of the mask 3 (a position of the chip of the arrayed waveguide grating is moved to another position). Therefore, the chip of the arrayed waveguide grating is very easily detached.

In one embodiment, the mask 3 is formed by a Teflon plate (Teflon is a trademark). After the metallic film 1 is manufactured, the mask 3 is detached and cleaned and can be reutilized by using the Teflon plate.

Figure 1E:
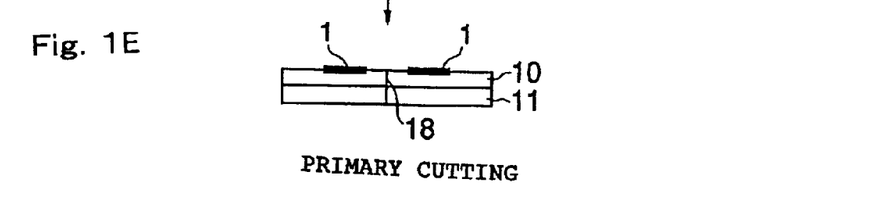

Primary cutting of the waveguide forming area 10 and the substrate 11 is next performed in FIG. 1E. In this primary cutting, a non-intersecting planes 18 is formed within an area shown by a portion A between two metallic films 1 as shown in FIGS. 6A and 6B. Thereafter, similar to the cases of FIGS. 5D and 5E, the position shifting member 17 is fixed (rod fixation) and secondary cutting is performed in processes of FIGS. 1F and 1G.

In one example, as shown in FIG. 2, an optical fiber 23 fixed to an optical fiber block 21 is connected (bonded) to the side of an optical input waveguide 21, and an optical fiber tape 24 fixed to an optical fiber array 22 is connected (bonded) to the side of an optical output waveguide 16 so that an arrayed waveguide grating shown in FIG. 2 is completed.

In FIG. 2, the first waveguide forming area 10a and the second waveguide forming area 10b are spaced from each other in positions of the intersecting planes. For example, the distance of a portion A (the distance between non-intersecting planes 18) shown in FIG. 2 is set to about 100 μm, and the distance of a portion B (the distance between intersecting planes 8) shown in FIG. 2 is set to about 25 μm.

The metallic film 1 is formed by laminating Cr/Cu sequentially having 0.1/0.5 (in a unit of μm) in thickness, Cr/Ti/Pt/Au sequentially having 0.1/0.1/0.1/0.6 (in a unit of μm) in thickness, or Ti/Pt/Au sequentially having 0.1/0.1/0.6 (in a unit of μm) in thickness. However, the metallic film 1 is not limited to these cases.

In accordance with the above embodiment, it is not necessary to perform a complicated operation such as photolithography and lift-off as in the metallic film manufacturing method of FIG. 5B. Further, a mask 3 having a hole approximately formed in the same shape as the manufactured metallic film is prepared, and is arranged such that the hole of the mask 3 corresponds to a manufacturing portion of the metallic film, and the metallic film 1 is manufactured in its manufacturing portion. Accordingly, a simple operation is performed. After the metallic film 1 is manufactured, it is sufficient to detach the mask 3 from a device, and take a chip out of the interior of the mask 3. Therefore, a device construction for performing these operations is also simplified, and device cost can be reduced.

Accordingly, the metallic film 1 is manufactured after the annealing process. After the metallic film is manufactured, the position shifting member 17 is arranged through the metallic film 1 in a form in which the position shifting member 17 lies across the first waveguide forming area 10a and the second waveguide forming area 10b through the non-intersecting planes 18 Thus, it is possible to very simply manufacture an arrayed waveguide grating able to approximately set each light transmitting central wavelength of the arrayed waveguide grating to a set wavelength at optionally predetermined temperature (for example 25° C.) at low cost.

The invention is not limited to the above embodiment, but various embodiment modes can be adopted. For example, in the above embodiment, the mask 3 is formed by a Teflon plate, but a forming material of the mask 3 is not particularly limited, but is suitably set. However, when the mask 3 is formed by a Teflon plate, it is possible to easily process the hole 2 and clean the mask 3 after the metallic film 1 is manufactured.

Figure 3A:
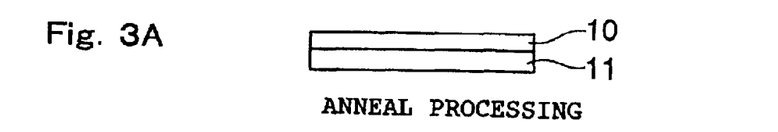
FIGS. 3A to 3F are explanatory views showing another manufacturing process example of the arrayed waveguide grating in the invention.
Figure 3B:
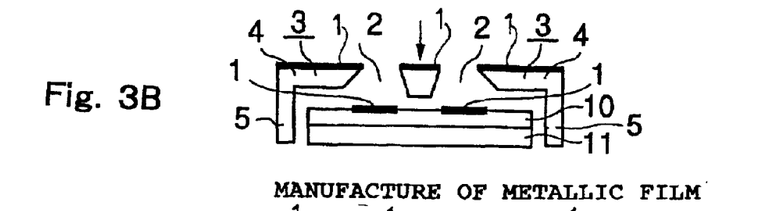
Figure 3C:
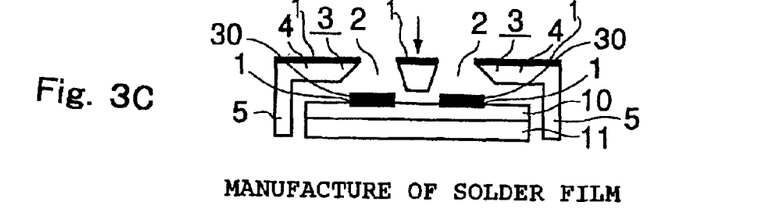

In a manufacturing process of the arrayed waveguide grating shown in FIG. 2, similar to the metallic film 1, the solder 30 may be also formed by EB evaporation, electrical resistance heating evaporation, etc. using the mask 3 instead of a chip form of the solder 30. In this case, after processes shown in FIGS. 1A and 1B, similar to FIGS. 1C and 1D, the metallic film 1 is manufactured after the annealing process of the arrayed waveguide grating as shown in FIGS. 3A and 3B. Thereafter, the solder 30 is formed by using the mask 3 as shown in FIG. 3C.

Figure 1F:
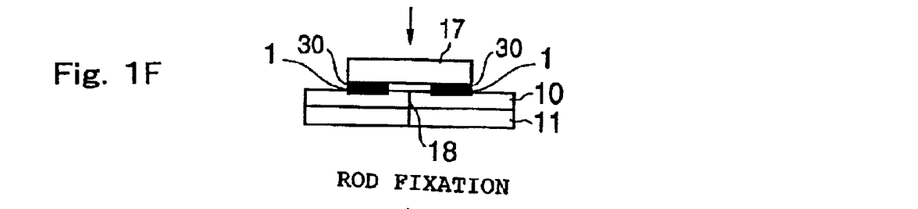
Figure 1G:
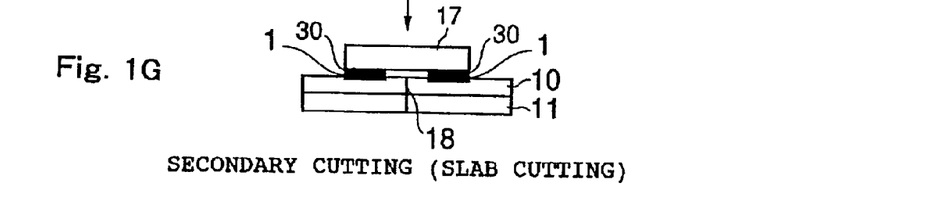
Figure 3D:
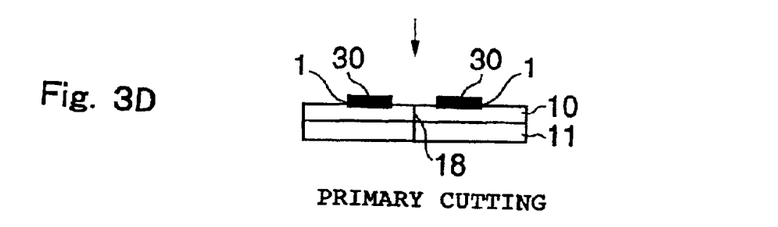
Figure 3E:
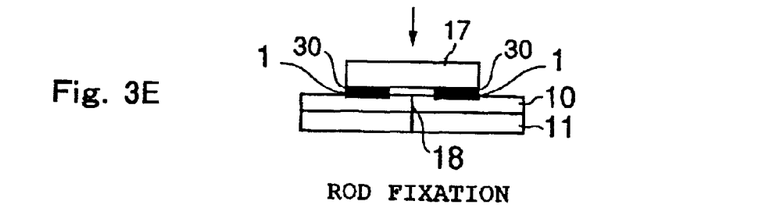
Figure 3F:
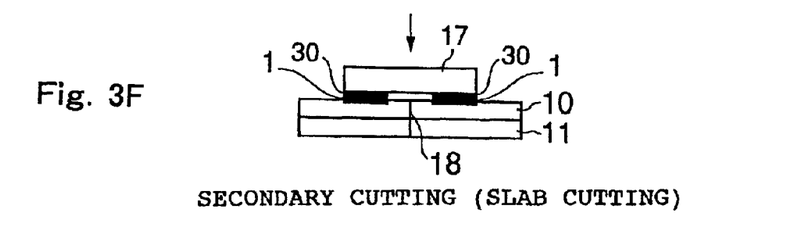

Thereafter, similar to FIGS. 1E to 1G, if processes of FIGS. 3D to 3F are performed and the optical fiber block 21 and the optical fiber array 22 shown in FIG. 2 are connected, the arrayed waveguide grating shown in FIG. 2 is completed.

Further, a kind, a shape, a size, etc. of the metallic film 1 formed by the manufacturing method of the metallic film to the planar lightwave circuit in the invention, are not particularly limited, but are suitably set. Various metallic films 1 can be manufactured by using the mask 3 having a hole approximately having the same shape as the manufactured metallic film. Further, a manufacturing position of the metallic film 1 is not limited to the surface side of the planar lightwave circuit, but may be arranged on at least one of front and rear sides of the planar lightwave circuit.

Further, in FIG. 2, the metallic film 1 is formed on a side of the waveguide forming area 10 on a surface side of the arrayed waveguide grating, but may be also formed on a rear side (a rear side of the substrate 11) of the arrayed waveguide grating.

Further, the planar lightwave circuit (arrayed waveguide grating) having the metallic film manufactured by using the manufacturing method of the metallic film to the planar lightwave circuit of the invention is not necessarily arranged such that the position shifting member 17 lies across the waveguide forming areas 10a and 10b through the metallic film 1 as shown in FIG. 2. For example, a base of the arrayed waveguide grating may be arranged, and one end side of the position shifting member 17 may be fixed to this base, and the other end side of the position shifting member 17 may be fixed to at least one of front and rear sides of the arrayed waveguide grating through the metallic film 1.

What is claimed is:

1. A method for manufacturing a planar lightwave circuit having a metallic film, comprising the steps of:

preparing a mask having a hole formed in approximately the same shape as the metallic film;

arranging said mask such that the hole of the mask corresponds to a manufacturing portion on said planar lightwave circuit, where said metallic film is to be formed; and manufacturing the metallic film in the manufacturing portion on at least one of front or rear faces of the planar lightwave circuit through the hole of the mask.

2. A method for manufacturing the planar lightwave circuit according to claim 1, wherein the metallic film is manufactured after performing an annealing process of the planar lightwave circuit.

3. A planar lightwave circuit having a metallic film and a waveguide construction of an arrayed waveguide grating, and this waveguide construction comprising:

one or more optical input waveguides arranged side by side;

a first slab waveguide connected to an exit end of said optical input waveguides;

an arrayed waveguide connected to an exit end of said first slab waveguide, and having a plurality of channel waveguides arranged side by side for transmitting light that has traveled through said first slab waveguide, said channel waveguides having different lengths with the difference preset;

a second slab waveguide connected to an exit end of the arrayed waveguide; and a plurality of optical output waveguides arranged side by side and connected to an exit end of said second slab waveguide;

wherein at least one of said first and second slab waveguide is divided into two by intersecting planes that intersect a route of the light traveling along the slab waveguide, the intersecting planes serve as dividing planes and divide a waveguide forming region into a first waveguide forming region that includes one portion of the divided slab waveguide and a second waveguide forming region that includes the other portion of the divided slab waveguide, one of or both of the first waveguide forming region and the second waveguide forming region are moved along the dividing planes by a position shifting member;

an end portion side of the position shifting member is fixed to at least the one of the first waveguide forming region and the second waveguide forming region through the metallic film; and the metallic film is formed on at least one of front and rear faces of the planar lightwave circuit, said metallic film having a shape that corresponds to a hole formed in a mask used to make said metallic film.

4. A planar lightwave circuit having a metallic film and a waveguide construction of an arrayed waveguide grating, and this waveguide construction comprising:

one or more optical input waveguides arranged side by side;

a first slab waveguide connected to an exit end of the optical input waveguide;

an arrayed waveguide connected to an exit end of said first slab waveguide;

a second slab waveguide connected to an exit end of said arrayed waveguide; and a plurality of optical output waveguides arranged side by side and connected to an exit end of said second slab waveguide;

wherein at least one of said first and second slab waveguides is divided into two by intersecting planes that intersect a route of the light traveling along the slab waveguide;

an end portion side of a position shifting member is fixed to at least one of the first waveguide forming region and the second waveguide forming region through the metallic film; and said metallic film is formed on at least one of front and rear faces of the planar lightwave circuit, said planar lightwave circuit having been subjected to an annealing process, said metallic film having a shape that corresponds to a hole formed in a mask used to make said metallic film.

* * * * *